Nov. 3, 1970       B. B. FOSTER       3,538,393
SWITCHING CIRCUIT
Filed July 9, 1969
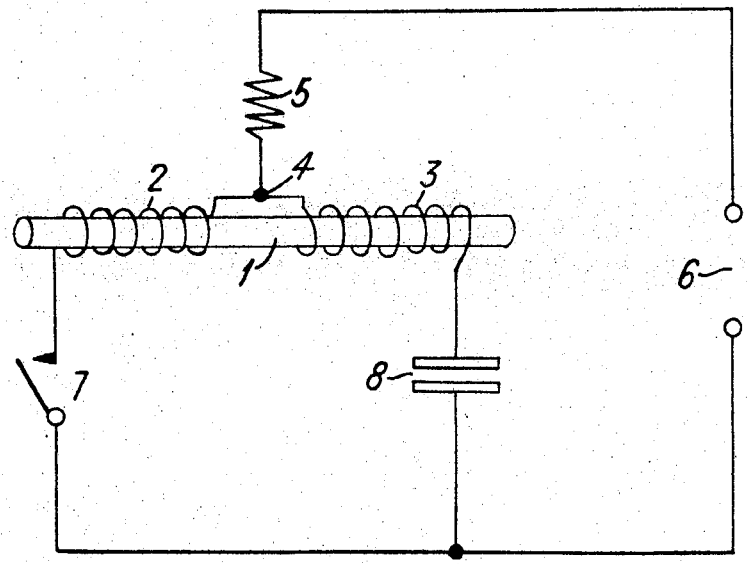
Inventor
B. B. Foster
By James B. Raden
Attorney

United States Patent Office 3,538,393
Patented Nov. 3, 1970

3,538,393
SWITCHING CIRCUIT
Basil Bernard Foster, London, England, assignor to International Standard Electric Corporation, New York, N.Y., a corporation of Delaware
Filed July 9, 1969, Ser. No. 840,362
Claims priority, application Great Britain, July 18, 1968, 34,168/68
Int. Cl. H01l 47/02
U.S. Cl. 317—151                                    4 Claims

ABSTRACT OF THE DISCLOSURE

A circuit is provided to speed-up the opening and closing of relay contacts. The circuit automatically assures that the "hold" current will not be excessive. The circuit includes a capacitor permanently wired across a voltage source to serve as a secondary source, or sink, for current so that magnetic fields in a relay may be more quickly established and extinguished.

---

The invention relates to a quick make, quick break circuit for operating electromagnetic devices, for example relays or clutches.

In applications such as electrical signalling it is of importance that the response of an electromagnetic device to a control current should be as rapid as possible.

The speed with which a magnetic flux can be built up in an electromagnetic device to a magnitude sufficient to cause operation depends amongst other things on the magnitude of the time constant $L/R$ of the electromagnetic circuit, where L is the inductance of the winding of the device and R is the total circuit resistance, and on the magnitude of the impressed electromotive force.

The values of L and R are usually determined by design requirements, so that the only way to speed up the operation of the device is to increase the EMF applied to the circuit, since at any instant of time during the built-up of the magnetic field the latter is proportional to the applied EMF.

It is known that the number of ampere turns needed to operate an electromagnetic device having a moving armature is greater than that required to retain the armature in the operated condition. Therefore if the EMF applied to the circuit is increased sufficiently to ensure rapid operation, the "hold" current will exceed the required value and will result in inefficiency and heating of the device. It is therefore desirable that the circuit should provide a high current through the winding during switch on period and a reduced current after the device has operated.

Although the speed with which the device releases is usually of less importance than the speed with which it makes, none the less it is desirable that the release time should not be unduly delayed.

Although several methods are known to slow down the release of an electro-magnetic device none are available to speed the process up. The "normal" release time is determined in the main by design factors determining the magnitude of eddy currents induced in the core by the collapsing field, which currents tend to prevent the field to collapse. Any method which would aid the collapse of the field would therefore speed up the release of the device.

According to the invention there is provided a quick make, quick break circuit for the operation of an electromagnetic device, for example a relay, said device including an electromagnetic winding having two sections on a common magnetic coil, the circuit comprising a first branch formed by the first of said sections connected in series with a capacitor and a second branch formed by the second section connected in series with a switching means, said first and second branches being connected in parallel with each other, the junction points of the branches being connected to a source of DC voltage via a resistor, and the sections of the winding being so poled that the currents flowing from said source in the two branches cause mutually opposing magnetic effects.

The invention will now be described with reference to the accompanying drawing which shows the circuit diagram of an embodiment of the invention.

In the figure the magnetic core of the device, for example a relay, is indicated by 1. The armature, which forms part of the magnetic circuit is not shown. The magnetic core is provided with an electric winding having two sections 2 and 3. The junction point 4 of the two windings is taken via resistor 5 to a terminal of a power source. The free end of one section is connected via a switch 7 to the other terminal of the source 6. Although in the drawing a mechanical switch is indicated for simplicity, the switch can be any known electronic or thermionic device. The free end of the other section is taken to other terminal of the power source via capacitor 8.

The operation of the device is as follows.

In the "normal" condition of the device i.e. with switch 7 open the capacitor is charged up to the full voltage of the source and no current flows in either section of the winding.

When switch 7 is closed, current will begin to flow through section 2 of the winding, the maximum value of this current being determined by the value of resistor 5, including the resistance of winding 2. Due to the voltage drop across resistor 5 the potential of point 4 will have dropped below the value to which the capacitor 8 is charged. The latter will therefore begin to discharge through sections 3 and 2, the winding sense of the sections being such that both aid each other in establishing the magnetic field in the core. The net result is that a more rapid growth of field is obtained than would have been the case if only section 2 of the winding were provided.

The capacitor discharge continues until its potential has fallen to that of point 4. No current now flows in section 3 of the winding. The value of resistor 5 is chosen to provide section 2 of the winding with the number of ampere timing required to hold the device in the operated condition.

When switch 7 is opened and the flow of current in section 2 is interrupted the potential of point 4 rises to its full value of the source 6 and the capacitor begins to change via section 3. The current in section 3 flows now in the opposite direction and produces a field which opposes that established in the core while switch 7 was closed thereby speeding up the release of the device.

It is to be understood that the foregoing description of specific examples of this invention is not to be considered as a limitation of its scope.

What is claimed is:

1. A quick make, quick break circuit for the operation of an electromagnetic device, for example a relay, said device including an electromagnetic winding having two sections on a common magnetic core, the circuit comprising a first branch formed by the first of said sections connected in series with a capacitor and a second branch formed by the second section connected in series with a switching means, said first and second branches being connected in parallel with each other, the junction points of the branches being connected to a source of DC voltage via a resistor and the sections of the winding being so poled that the currents flowing from said source in the two branches cause mutually opposing magnetic effects.

2. A circuit as claimed in claim 1 in which when said switching means is non-conductive the capacitor is charged to substantially the voltage of said source.

3. A circuit as claimed in claim 1 in which when the switching means is made to conduct, the current flowing through the section connected to the capacitor and the current flowing through the section connected to the switching means produce mutually aiding magnetic effects.

4. A circuit as claimed in claim 3 in which when the switching means is made non-conducting the currents flowing through the winding section connected to the capacitor produce a magnetic effect opposing that existing before the switching means was made non-conductive.

References Cited

UNITED STATES PATENTS

| | | | | |
|---|---|---|---|---|
| 2,817,806 | 12/1957 | Borell | 307— | 132 X |
| 3,361,939 | 1/1968 | Smith | 317— | 155 X |

J D MILLER, Primary Examiner

W. J. SMITH, Assistant Examiner

U.S. Cl. X.R.

317—155.5